United States Patent
Kim

(10) Patent No.: US 9,013,858 B2
(45) Date of Patent: *Apr. 21, 2015

(54) MULTILAYER CERAMIC ELECTRONIC COMPONENT

(71) Applicant: Samsung Electro-Mechanics Co., Ltd., Suwon, Gyunggi-do (KR)

(72) Inventor: Sang Huk Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,331

(22) Filed: Apr. 15, 2013

(65) Prior Publication Data

US 2013/0235508 A1    Sep. 12, 2013

Related U.S. Application Data

(63) Continuation of application No. 13/478,685, filed on May 23, 2012, now Pat. No. 8,422,196.

(30) Foreign Application Priority Data

May 31, 2011    (KR) .......................... 10-2011-0052480

(51) Int. Cl.
*H01G 4/228*    (2006.01)
*H01G 4/06*    (2006.01)
*H01G 4/30*    (2006.01)
*H01G 4/005*    (2006.01)
*H01G 4/12*    (2006.01)

(52) U.S. Cl.
CPC ................. *H01G 4/30* (2013.01); *H01G 4/005* (2013.01); *H01G 4/12* (2013.01)

(58) Field of Classification Search
CPC .......... H01G 4/30; H01G 4/005; H01G 4/12; H01G 4/06
USPC ....................... 361/303, 311, 301.4
See application file for complete search history.

(56) References Cited

U.S. PATENT DOCUMENTS

| | | | |
|---|---|---|---|
| 7,157,396 B2 | 1/2007 | Watanabe et al. | |
| 7,394,644 B2 | 7/2008 | Kojima | |
| 2005/0264975 A1* | 12/2005 | Yamazaki | ................. 361/301.1 |
| 2009/0128988 A1 | 5/2009 | Sohn et al. | |

FOREIGN PATENT DOCUMENTS

| | | | |
|---|---|---|---|
| JP | 2008-091400 A | 4/2008 |
| JP | 2008-103448 A | 5/2008 |

* cited by examiner

*Primary Examiner* — Eric Thomas
(74) *Attorney, Agent, or Firm* — McDermott Will & Emery LLP

(57) ABSTRACT

There is provided a multilayer ceramic electronic component, including: a multilayer body having a dielectric layer; and a plurality of internal electrode layers provided in the multilayer body, and having ends exposed to at least one face of the multilayer body, wherein, a ratio of T2 to T1 (T2/T1) ranges from 0.70 to 0.95, when T1 represents a thickness of a capacity formation portion formed by overlapping the plurality of internal electrode layers and T2 represents a distance between ends of outermost internal electrodes arranged on one face of the multilayer body to which the ends of the internal electrodes are exposed, and a thickness D1 of the multilayer body, in which the capacity formation portion is formed, is greater than a thickness D2 of a first side of the multilayer body to which the ends of the internal electrodes are exposed.

17 Claims, 5 Drawing Sheets

MULTILAYER CERAMIC ELECTRONIC COMPONENT

CROSS-REFERENCE TO RELATED APPLICATIONS

This application is a continuation of U.S. application Ser. No. 13/478,685, filed May 23, 2012 now U.S. Pat. No. 8,422,196, issued Apr. 16, 2013, which claims the priority of Korean Patent Application No. 10-2011-0052480, filed on May 31, 2011, the disclosure of which is incorporated herein by reference.

BACKGROUND OF THE INVENTION

1. Field of the Invention

The present invention relates to a multilayer ceramic electronic component and, more particularly, a multilayer ceramic electronic component having high reliability.

2. Description of the Related Art

In general, an electronic component fabricated using a ceramic material, such as a capacitor, an inductor, a piezoelectric device, a varistor, a thermistor, or the like, generally has a ceramic body made of a ceramic material, internal electrodes provided in the ceramic body, and external electrodes (that is, termination electrodes) placed on surfaces of the ceramic body so as to be connected to respective internal electrodes.

Among ceramic electronic components, a multilayer ceramic capacitor typically includes a plurality of sequentially laminated dielectric layers, internal electrodes arranged to face each other while having each dielectric layer disposed therebetween, and termination electrodes electrically connected to respective internal electrodes.

Such a multilayer ceramic capacitor has beneficial features such as small size but high capacity, ease of mounting, and the like, and is therefore widely used as a component of mobile communications equipment such as computers, PDAs, mobile phones, and so forth.

In recent years, with the trend towards smaller sized multifunctional electronic products, electronic parts have have tended to have a smaller size and high performance. In response, high capacity multilayer ceramic capacitors having a large capacity while having a small size are required. In order to increase the capacity of a multilayer ceramic capacitor, the number of lamination layers thereof should be increased while a thickness of each of the dielectric layer and the internal electrode layers is decreased. However, if the dielectric layer and the internal electrode are thinned and the number of lamination layers is increased, the possibility of dielectric breakdown may be increased and delamination and cracking may occur, thus causing a degradation in reliability of the multilayer ceramic capacitor. Accordingly, there remain limitations in the development of a high capacity multilayer ceramic capacitor and the miniaturization thereof.

SUMMARY OF THE INVENTION

An aspect of the present invention provides a multilayer ceramic electronic component having high reliability.

According to an aspect of the present invention, there is provided a multilayer ceramic electronic component, including: a multilayer body having a dielectric layer; and a plurality of internal electrode layers provided in the multilayer body, and having ends exposed to at least one face of the multilayer body, wherein a ratio of T2 to T1 (T2/T1) ranges from 0.70 to 0.95, when T1 represents a thickness of a capacity formation portion formed by overlapping the plurality of internal electrode layers and T2 represents a distance between ends of outermost internal electrodes arranged on one face of the multilayer body to which the ends of the internal electrodes are exposed, and a thickness D1 of the multilayer body, in which the capacity formation portion is formed, is greater than a thickness D2 of a first side of the multilayer body to which the ends of the internal electrodes are exposed.

The thickness D1 of the multilayer body having the capacity formation portion formed therein may be a maximum thickness of the multilayer body.

The thickness T1 of the capacity formation portion may be a distance between the outermost internal electrodes arranged in a center of the multilayer body.

The thickness T1 of the capacity formation portion may be measured as a distance between an internal electrode arranged on an uppermost layer and another internal electrode arranged on a lowermost layer, on an intersecting line of two cross-sections perpendicular to each other at a center of the multilayer body.

The thickness T1 of the capacity formation portion and the distance T2 between the ends of outermost internal electrodes may be measured on the same cross-section of the multilayer body.

The distance T2 between the ends of outermost internal electrodes may be measured on a center of the first side of the multilayer body.

A ratio of the thickness D2 of the first side of the multilayer body to the thickness D1 of the multilayer body having the capacity formation portion formed therein, may range from 0.75 to 0.97.

The thickness D1 of the multilayer body having the capacity formation portion formed therein may range from 310 to 320 μM.

A thickness of the multilayer body having the capacity formation portion formed therein may be greater than a thickness of a lateral face of the multilayer body, to which the ends of the internal electrodes are not exposed.

The thickness T1 of the capacity formation portion may range from 270 to 280 μm.

A ratio of a minimum thickness D4 of the first side of the multilayer body to a maximum thickness D3 of the first side of the multilayer body may range from 0.78 to 0.95.

The minimum thickness D4 of the first side of the multilayer body may be formed on a margin portion, on which internal electrodes are not present.

A thickness of the dielectric layer arranged between the internal electrode layers may be less than 0.65 μm.

A thickness of the internal electrode layers may be 0.7 μm or less.

According to another aspect of the present invention, there is provided a multilayer ceramic capacitor, including: a multilayer body having first and second sides; and a plurality of first and second internal electrode layers provided in the multilayer body, and having ends exposed to at least one of the first and second sides of the multilayer body, wherein, when a thickness of a capacity formation portion formed by overlapping the plurality of first and second internal electrode layers is T1 and a distance between ends of outermost first internal electrodes or ends of outermost second internal electrodes arranged on the first side or the second side of the multilayer body is T2, a ratio of T2 to T1 (T2/T1) ranges from 0.70 to 0.95; a distance between the first and second internal electrode layers disposed to be adjacent in the capacity formation portion is less than 0.65 μm; and a thickness of the multilayer body having the capacity formation portion formed therein is greater than a thickness of the first side or the second side of the multilayer body.

The thickness T1 of the capacity formation portion may be a distance between outermost internal electrodes arranged at the center of the multilayer body.

The thickness T1 of the capacity formation portion and the distance T2 between the ends of outermost first internal electrodes or the ends of outermost second internal electrodes arranged on the first side or the second side of the multilayer body, may be measured on the same cross-section taken in a length-thickness of the multilayer body.

A thickness of a center of the multilayer body may be greater than a thickness of an lateral face of the multilayer body, in the width direction thereof.

According to another aspect of the present invention, there is provided a multilayer ceramic capacitor, including: a multilayer body having three pairs of opposing faces; a plurality of internal electrode layers provided in the multilayer body, and having ends exposed to at least one face of the multilayer body; and a plurality of dielectric layers arranged between the first and second internal electrode layers and having a thickness of less than 0.65 μm, wherein, when a thickness of a capacity formation portion formed by overlapping the plurality of first and second internal electrode layers is 'T1' and a distance between ends of outermost first electrodes or ends of outermost second electrodes arranged on one face of the multilayer body, on which the ends of the internal electrodes are exposed, is T2, a ratio of T2 to T1 (T2/T1) ranges from 0.70 to 0.95; and when a thickness of the multilayer body having the capacity formation portion formed therein is D1 and a thickness of one face of the multilayer body, to which the ends of the first and second internal electrodes are exposed is D2, a ratio of D2 to D1 (D2/D1) ranges from 0.75 to 0.97.

A ratio of a minimum thickness D4 of a first side of the multilayer body to a maximum thickness D3 of the first side of the multilayer body ranges from 0.78 to 0.95, and the first side of the multilayer body is defined as a side to which the ends of the internal electrodes are exposed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
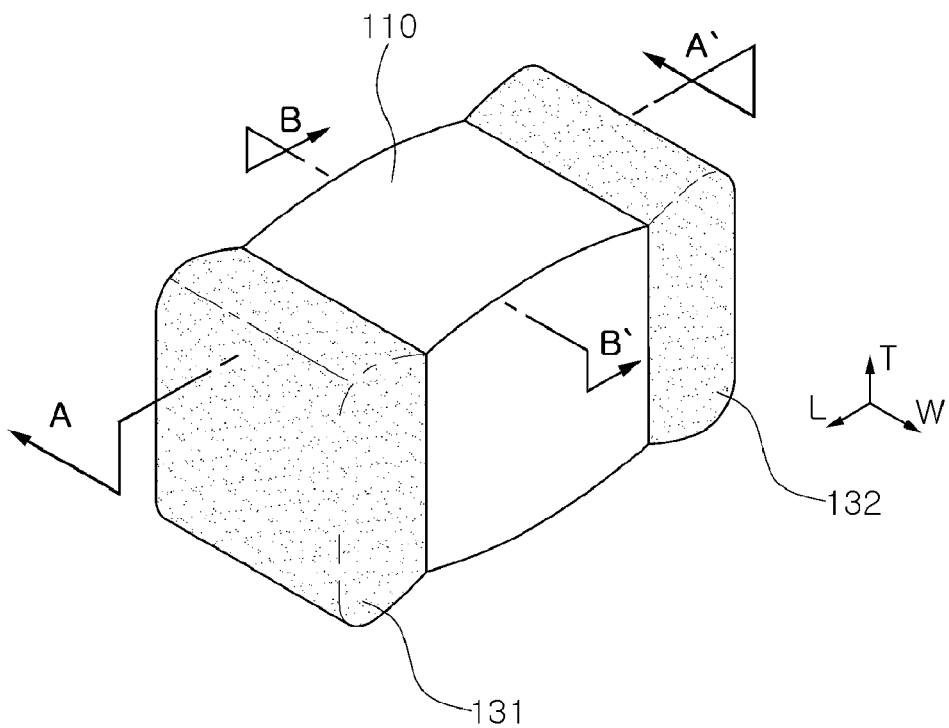
FIG. 1 is a schematic perspective view of a multilayer ceramic capacitor according to an embodiment of the present invention.

Hereinafter, preferred embodiments of the present invention will be described in detail with reference to the accompanying drawings. However, the present invention may be embodied in various different forms and should not be construed as being limited to the embodiments set forth herein. Rather, these embodiments are provided so that this disclosure will be thorough and complete, and will fully convey the scope of the present invention to those skilled in the art to which the present invention pertains. Therefore, shapes and/or sizes of respective elements shown in the accompanying drawings may be enlarged for clarity and like reference numerals denote elements having substantially the same configurations or performing similar functions and actions throughout the drawings.

Figure 2:
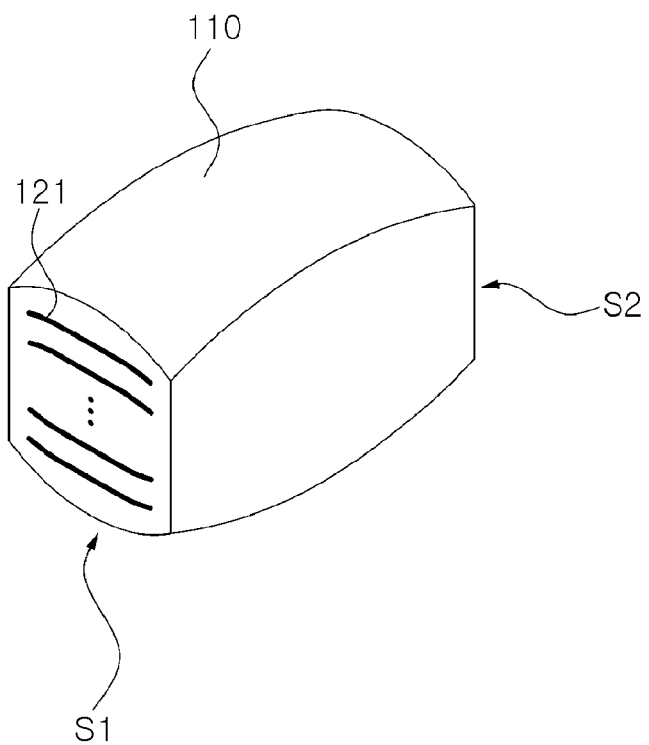
FIG. 2 is a schematic perspective view of a multilayer body according to an embodiment of the present invention.
Figure 3:
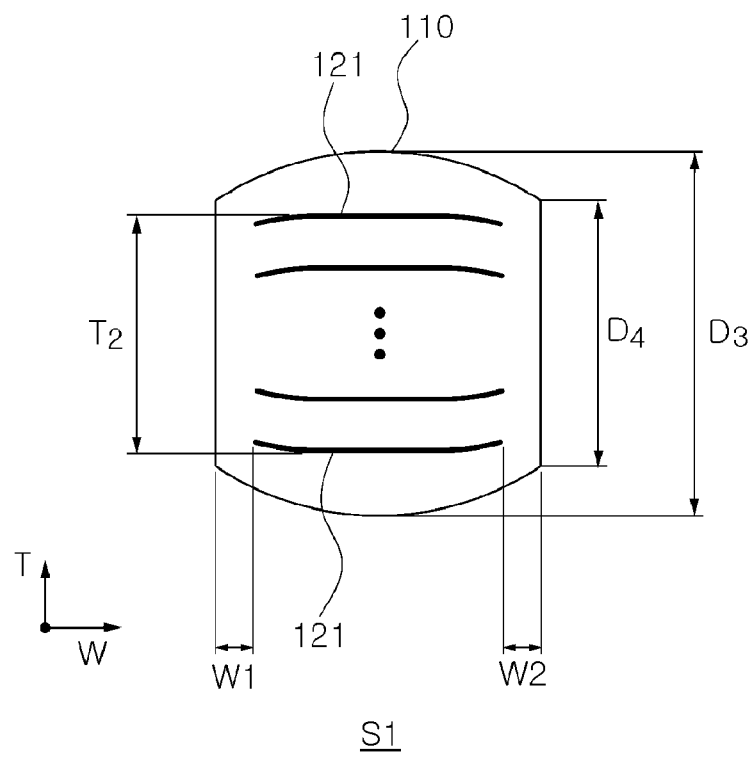
FIG. 3 is a schematic side view showing one side of the multilayer body.
Figure 4:
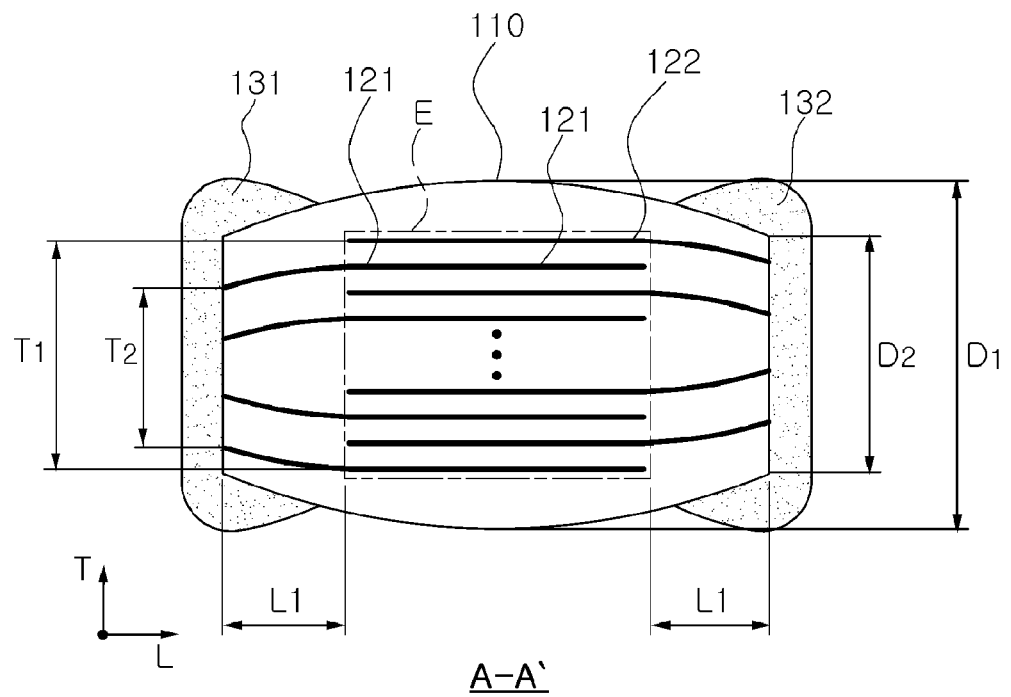
FIG. 4 is a cross-sectional view of the multilayer ceramic capacitor, taken in direction A-A' shown in FIG. 1.
Figure 5:
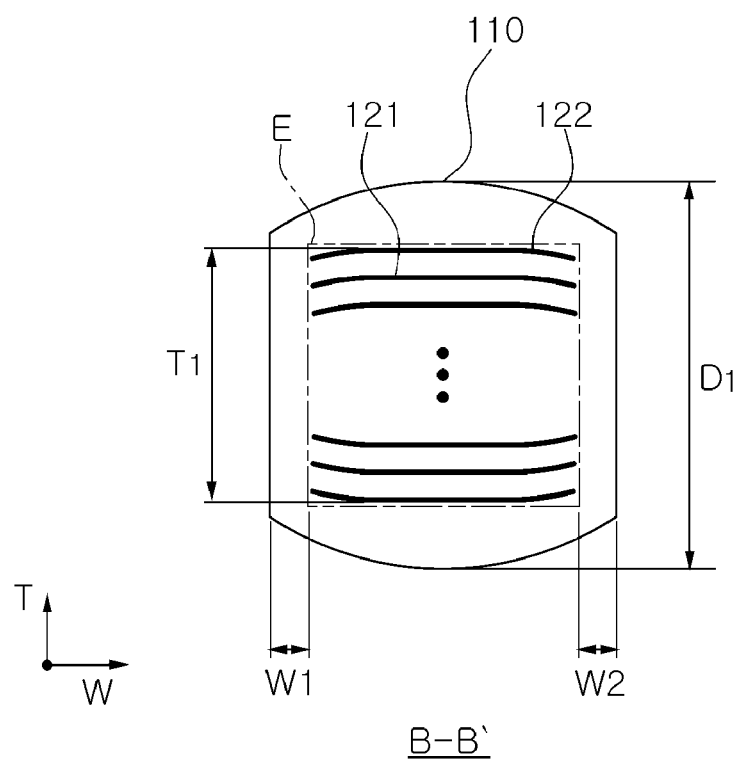
FIG. 5 is a cross-sectional view of the multilayer ceramic capacitor, taken in direction B-B' shown in FIG. 1.
Figure 6:
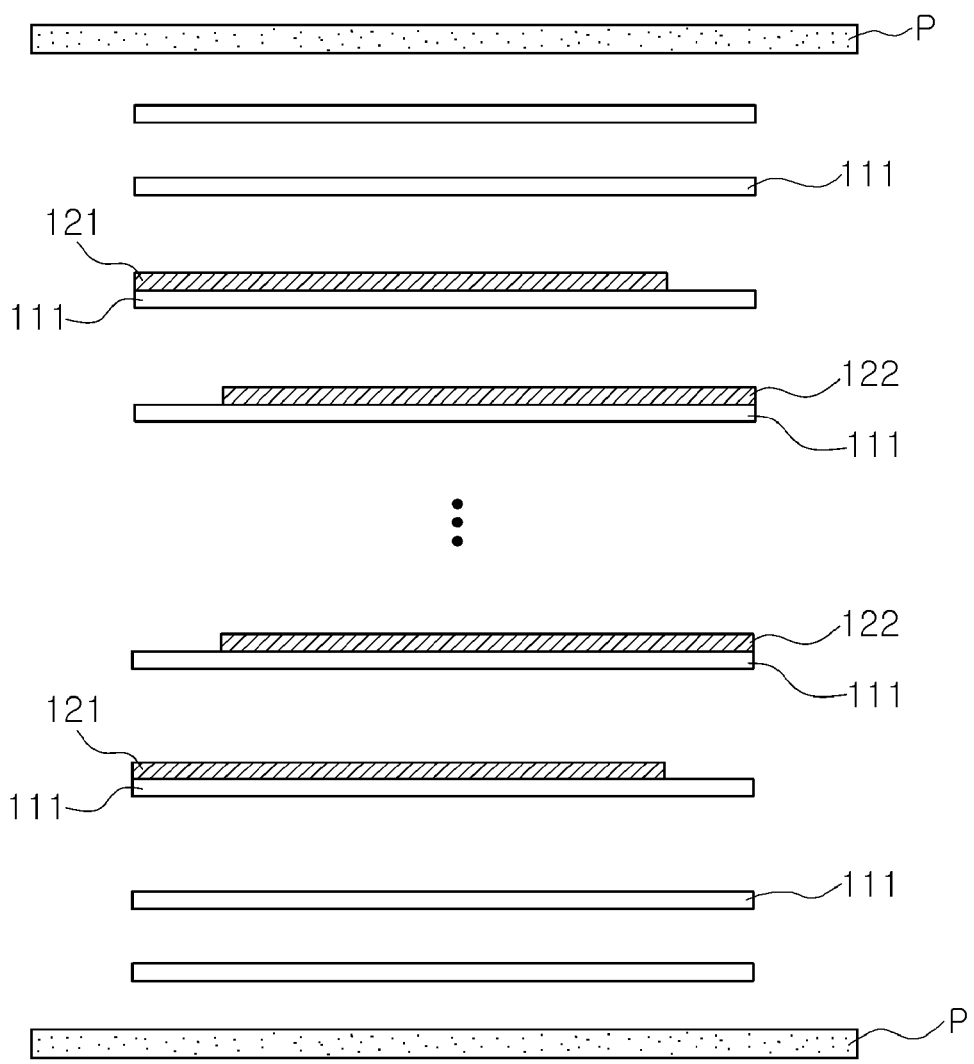
FIG. 6 is a schematic exploded cross-sectional view of the multilayer body.
Figure 7A:
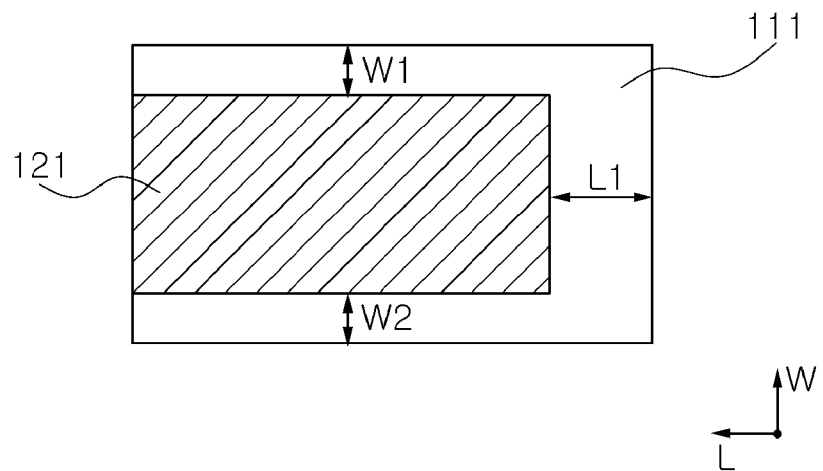
FIGS. 7A and 7B are top plan views respectively showing a dielectric layer having an inner electrode layer provided thereon.
Figure 7B:
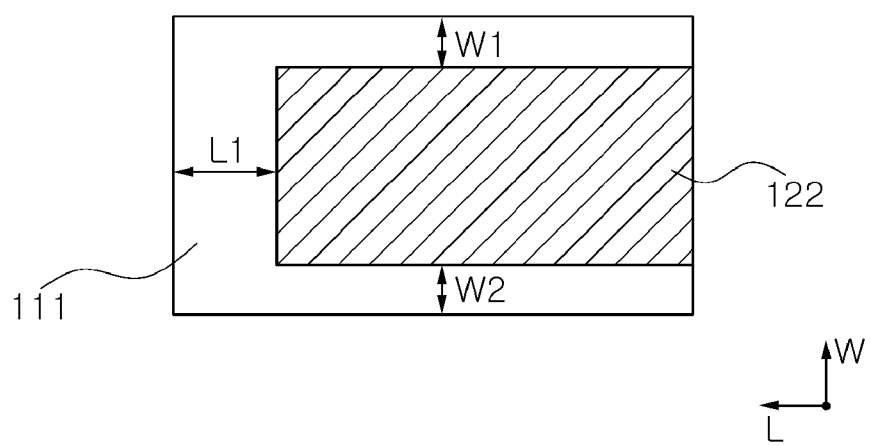

FIG. 1 is a schematic perspective view of a multilayer ceramic capacitor according to an embodiment of the present invention. FIG. 2 is a schematic perspective view of a multilayer body according to an embodiment of the present invention. FIG. 3 is a schematic side view showing one side of the multilayer body. FIG. 4 is a cross-sectional view of the multilayer ceramic capacitor, taken in direction A-A' shown in FIG. 1. FIG. 5 is a cross-sectional view of the multilayer ceramic capacitor, taken indirection B-B' shown in FIG. 1. FIG. 6 is a schematic exploded cross-sectional view of the multilayer body. FIGS. 7A and 7B are top plan views respectively showing a dielectric layer having an inner electrode layer provided thereon.

Multilayer ceramic electronic components may include, for example, a capacitor, an inductor, a piezoelectric device, a varistor, a thermistor, or the like, and each may include a ceramic body made of a ceramic material, internal electrodes provided in the ceramic body, as well as external electrodes provided on the surface of the ceramic body and electrically connected to respective internal electrodes. Hereinafter, referring to FIGS. 1 to 6, an embodiment of the multilayer ceramic capacitor among the multilayer ceramic electronic components described above may be described in detail.

Referring to FIGS. 1 to 6, a multilayer ceramic capacitor according to an embodiment of the present invention may include: a multilayer body 110; and external electrodes 131 and 132 provided at both sides of the multilayer body.

In the embodiment of the present invention, a 'length direction' of the multilayer ceramic capacitor may be defined as an 'L' direction as shown in FIG. 1, a 'width direction' may be defined as a 'W' direction and a 'thickness direction' may be defined as a 'T' direction. Here, the 'thickness direction' may be the same as a direction in which dielectric layers are stacked, that is, a 'lamination direction.'

FIG. 2 is a schematic perspective view showing a multilayer body 110 except for the external electrodes 131 and 132 in the multilayer ceramic capacitor shown in FIG. 1, FIG. 3 is a schematic side view showing one side of the multilayer body, and FIG. 6 is a schematic exploded cross-sectional view showing the multilayer body.

As shown in the figures, the multilayer body 110 may be fabricated by laminating a plurality of dielectric layers 111 in the width direction. The plurality of dielectric layers constituting the multilayer body 110 may be in a sintered state and may be integrated together, such that boundaries between adjacent dielectric layers cannot readily be distinguished.

Each dielectric layer may be formed of a ceramic powder having a high dielectric permittivity and the ceramic powder used herein may include, but is not limited to, barium titanate ($BaTiO_3$) powder, strontium titanate ($SrTiO_3$) powder, or the like.

Without being particularly limited, a thickness of each dielectric layer 111 may be less than 0.65 μm. The thickness of the dielectric layer 111 may be 0.55 μm or less. The thickness of the dielectric layer 111 may range from 0.4 to less than 0.65 μm or from 0.45 to 0.55 μm.

In an embodiment of the present invention, a thickness of each of the dielectric layers may refer to an average thickness of the dielectric layer disposed between internal electrodes 121 and 122. The average thickness of the dielectric layer may be measured by image-scanning on a cross-section taken in the length-thickness (L-T) direction of the multilayer body 110 through a scanning electron microscope (SEM) (magnified 10,000 times), as shown in FIG. 4. In detail, an average thickness may be acquired by measuring thicknesses of a dielectric layer in 30 positions in the length L direction thereof, the 30 positions being located at equal intervals, from the scanned image, and then averaging the values of the measured thicknesses. The 30 positions located at equal intervals may be determined on a capacity formation portion (E), referring to a region on which the first and second internal electrodes 121 and 122 are overlapped. As shown in FIG. 4, the capacity formation portion (E) may refer to a region on which the first and second internal electrodes 121 and 122 are overlapped. In addition, in a case in which the measurement of an average value is executed with respect to 10 dielectric layers, the average thickness of each of the dielectric layers may be more generalized.

In addition, the thickness of the dielectric layer may be defined as an average distance between adjacent internal electrodes 121 and 122 in the capacity formation portion E. For instance, by measuring a distance between the adjacent internal electrodes on each of 30 positions at equal intervals in the length direction of the internal electrode layer, from the scanned image, an average distance may be calculated. In addition, if such measurement of average distance is extended to 10 pairs of internal electrode layers arranged in the capacity formation portion E, the average thickness between the adjacent internal electrode layers may be more generalized. Without being particularly limited thereto, a distance between a first internal electrode layer 121 and a second internal electrode layer 122 adjacent to each other may be less than 0.65 μm. The distance between the adjacent first and second internal electrode layers 121 and 122 may be 0.55 μm or less. Alternatively, the distance between the adjacent first and second internal electrode layers 121 and 122 may range from 0.4 to less than 0.65 μm. Further, the distance between the adjacent first and second internal electrode layers 121 and 122 may range from 0.45 to 0.55 μm.

According to an embodiment of the present invention, the multilayer body 110 may have a hexahedral shape and three pairs of opposing faces. More particularly, a thickness of the center of the multilayer body may be greater than a thickness of the end thereof in the length direction, and the center of the multilayer body may be convex.

A plurality of internal electrodes 121 and 122 may be provided in the multilayer body 110. Such internal electrodes 121 and 122 may be placed on the dielectric layer 111 and arranged to face each other in the lamination direction of the dielectric layer while having dielectric layers disposed therebetween, by sintering. The internal electrode layers may be formed using conductive metals such as Ni, Cu, Pd, or the like, and each internal electrode layer may have a thickness of 0.7 μm or less, without being particularly limited thereto.

According to an embodiment of the present invention, 200 or more dielectric layers each having the internal electrode layers provided thereon may be laminated.

With regard to the plural internal electrodes 121 and 122, a pair of internal electrodes may include a first internal electrode 121 and a second electrode 122, which having different polarities from each other. As shown in FIGS. 7A and 7B, according to an embodiment of the present invention, the first and second internal electrodes 121 and 122 may have a square or rectangular shape.

Referring to FIGS. 7A and 7B, a length directional margin portion L1, on which the first or second internal electrode 121 or 122 is not present, may be formed in the length direction L of the dielectric layer 111, while a width directional margin portion W1 or W2, on which the first or second internal electrode 121 or 122 is not present, may be formed in the width direction W of the dielectric layer 111.

Referring to FIG. 4, due to the length directional margin portion L1, one ends of the first and second electrodes 121 and 122 ('the first and second electrode ends') may be respectively arranged at a predetermined interval from one sides of the multilayer body, while the other ends of the first and second electrodes 121 and 122 ('the other first and second electrode ends') may be exposed respectively on one sides of the multilayer body.

FIG. 2 is a schematic perspective view showing the multilayer body 110, while FIG. 3 is a schematic cross-sectional view showing a first side S1 of the multilayer body. The first side S1 of the multilayer body may be defined as a side on which the other end of the first internal electrode 121 is exposed. Likewise, an opposing side of the multilayer body, on which the other end of the second internal electrode 122 is exposed, may be defined as a second side S2.

Without being particularly limited thereto, according to an embodiment of the present invention, an end of the internal electrode may be exposed on at least one side of the multilayer body.

Although not illustrated, both of the first and second internal electrodes may have ends exposed on the same side of the multilayer body. Alternatively, ends of first or second internal electrodes may be exposed on at least two or more sides of the multilayer body.

The other ends of the first and second internal electrodes 121 and 122 exposed on the first and second sides S1 and S2 of the multilayer body 110, respectively, may be electrically connected to first and second external electrodes 131 and 132, which are provided respectively at both sides of the multilayer body.

FIG. 4 is a cross-sectional view taken in a direction A-A' shown in FIG. 1, wherein the multilayer ceramic capacitor is cut in the length-thickness direction (or L-T direction). FIG. 5 is a cross-sectional view taken in a direction B-B' shown in FIG. 1, wherein the multilayer ceramic capacitor is cut in the thickness-width direction (or T-W direction).

In a region of the multilayer body 110, on which the first and second internal electrodes are overlapped, electrostatic capacity may be imparted when applying an electric field. In the present invention, such a region, on which the first and second internal electrodes 121 and 122 are overlapped, may be referred to as a capacity formation portion E. On the other hand, another region, on which the first and second internal electrodes are not overlapped and only one of the first and second internal electrodes is present, may be referred to as an electrode withdrawal portion. The electrode withdrawal portion may be formed by the length directional margin portion L1.

According to an embodiment of the present invention, a thickness of the capacity formation portion E, on which the plural internal electrodes 121 and 122 are overlapped, may be defined as T1. The thickness T1 of the capacity formation portion E may be present in the center of the multilayer body and may be a distance between the outermost internal electrodes of the multilayer body. More particularly, the thickness T1 of the capacity formation portion E may be a distance between the inner electrodes arranged at the outermost periphery in the region, on which the first and second internal electrodes are overlapped, for example, on the uppermost layer and the lowermost layer. The thickness T1 of the capacity formation portion E may be defined on an intersecting line of two cross-sections perpendicular to each other at the center of the multilayer body. For instance, the cross-section in the direction A-A' shown in FIG. 4 is a cross-section of the center of the multilayer body while the cross-section in the direction B-B' shown in FIG. 5 is another cross-section of the center of the multilayer body. In this regard, on a cross line of both the cross-section in the direction A-A' and the cross-section in the direction B-B', a distance between the internal electrodes arranged on the uppermost layer and lowermost layer, respectively, may be the thickness T1 of the capacity formation portion E.

Further, a distance between ends of the internal electrode arranged at the outermost periphery on one side of the multilayer body may be defined as T2. More particularly, T2 may be a distance between the internal electrodes at the outermost periphery on the multilayer body face, on which the end of the first or second electrode is exposed, for example, a distance between the internal electrode provided on the uppermost layer and the internal electrode provided on the lowermost layer.

Referring to FIG. 3, the end of the first internal electrode 121 may be exposed on the first side S1 of the multilayer body, and a distance between the first internal electrode 121 arranged on the uppermost layer and the first internal electrode 121 arranged on the lowermost layer at the first side may be defined as T2.

The distance T2 between the outermost internal electrodes arranged on one side of the multilayer body, on which the end of the internal electrode is exposed, may be formed at the center of the side of multilayer body. At the first side S1 (of the multilayer body), T2 may be a distance between a center portion of the first internal electrode 121 arranged on the uppermost layer and a center portion of the first internal electrode 121 arranged on the lowermost layer.

In addition, as shown in FIG. 4, the thickness T1 of the capacity formation portion and the distance T2 between the outermost internal electrodes at the side of the multilayer body, on which the internal electrode ends are exposed, may be measured on the same cross-section of the multilayer body. In the embodiment shown in FIG. 4, The same cross-section may be a cross-section in a length-thickness (L-T) direction of the multilayer ceramic capacitor.

A ratio of T2 to T1 (T2/T1) may range from 0.70 to 0.95. Without being particularly limited thereto, the thickness T1 of the capacity formation portion may range from 270 to 280 μm.

In the multilayer body, the capacity formation portion, on which the first and second internal electrodes are overlapped, and the electrode withdrawal portion having only the first or second internal electrode formed therein may have different densities from each other, thus causing a difference in density. If such a difference in density between the capacity formation portion and the electrode withdrawal portion is increased, delamination and/or cracks may occur in the electrode withdrawal portion. A plating solution may penetrate through a site, on which delamination and/or cracks are created therein, in turn leading to a deterioration in reliability of the multilayer ceramic capacitor.

According to an embodiment of the present invention, differentially compressing the capacity formation portion and the electrode withdrawal portion may reduce the difference in density. Further, controlling a ratio of thicknesses of the capacity formation portion and the electrode withdrawal portion may reduce delamination and/or cracks of the multilayer ceramic capacitor while increasing the insulation breakdown voltage.

If a ratio of T2 to T1 (T2/T1) is less than 0.70, the possibility of delamination and/or crack creation in the electrode withdrawal portion is reduced. However, the electrode withdrawal portion is too compressed while the end of the internal electrode may be excessively warped. As a result, a distance between the adjacent internal electrodes is shortened and the dielectric layer disposed therebetween is thinner, in turn causing concentration of an electric field to this region. In such a case, the insulation breakdown voltage (property) may be degraded and characteristics under high temperature and humidity conditions may be deteriorated.

Further, when the ratio of T2 to T1 (T2/T1) exceeds 0.95, a compression extent of the electrode withdrawal portion is low, in turn increasing the possibility of delamination and/or crack creation while deteriorating characteristics under high temperature and humidity conditions.

As described above, in order to achieve miniaturization and an increase in capacity of the multilayer ceramic capacitor, the number of lamination must be increased while decreasing thicknesses of the dielectric layer and the internal electrode layer. However, with a decrease in the thickness of dielectric layer and internal electrode layer and increase in the number of laminations, a difference in density between the capacity formation portion having the internal electrodes overlapped therein and the electrode withdrawal portion is considerably increased. For this reason, the electrode withdrawal portion undergoes delamination and/or crack creation.

In the case in which the electrode withdrawal portion is excessively compressed to increase the density of the electrode withdrawal portion, the end of the internal electrode may be excessively warped, in turn narrowing a distance between the internal electrodes adjacent up and down to each other. An electric field may be concentrated on the region having narrowed distance between the internal electrodes and the possibility of insulation breakdown may be increased even at a low voltage.

However, according to an embodiment of the present invention, a thickness of one dielectric layer 111 may be less than 0.65 μm. Alternatively, according to an embodiment of the present invention, a thickness of one internal electrode layer may be 0.7 μM or less. Further, 200 or more dielectric layers each having the internal electrodes formed thereon may be laminated.

As described above, according to an embodiment of the present invention, even where the dielectric layer and the internal electrode layer are thinner, concentration of an electric field to a local region may be prevented by controlling a compression rate of the capacity formation portion and/or the electrode withdrawal portion and, in addition, the possibility of delamination and/or crack creation may be decreased.

As shown in FIGS. 4 and 5, according to an embodiment of the present invention, a thickness D1 of the multilayer body having the capacity formation portion E formed therein may be greater than a thickness D2 of one side of the multilayer body ('multilayer body side'). The multilayer body side may mean an end of the side in the length direction, and may be a first side S1 or second side S2, on which the end of the first internal electrode 121 or the second internal electrode 122 is exposed.

The thickness D1 of the multilayer body having the capacity formation portion E formed therein may be a maximum thickness of the multilayer body. Also, the thickness D2 of the multilayer body side may be determined in the region on which the first or second internal electrode is present. As shown in FIG. 3, the multilayer body side may include width directional margin portions W1 and W2, on which the first internal electrode 121 is not present, while the thickness D2 of the multilayer body side may be a thickness D2 of the multilayer body side in the region, which is excluded from the width directional margin portions W1 and W2 and on which the first electrode is present.

The thickness D1 of the multilayer body having the capacity formation portion E formed therein may range from 310 to 320 μm, without being particularly limited thereto.

A ratio (D2/D1) of the thickness of the multilayer body side to the thickness of the multilayer body having the capacity formation portion formed therein may range from 0.75 to 0.97.

If the ratio (D2/D1) of the thickness of the multilayer body side to the multilayer body having the capacity formation portion formed therein is less than 0.75, the possibility of delamination and/or crack creation in the electrode withdrawal portion is low. However, an electric field is concentrated to a local region, in turn leading to decrease in an insulation breakdown voltage and, in addition, deteriorating characteristics under high temperature and humidity conditions.

On the other hand, when the ratio (D2/D1) of the thickness of the multilayer body side to the multilayer body having the capacity formation portion formed therein exceeds 0.97, the possibility of delamination and/or crack creation is increased and characteristics under high temperature and humidity conditions may be deteriorated.

Further, according to an embodiment of the present invention, a thickness of the center of the multilayer body ('the center') may be greater than a thickness of the lateral face of the multilayer body in the width direction thereof ('the multilayer body lateral face'), as shown in FIGS. 3 and 5. The thickness of the center may be measured in a region on which the internal electrode is present. On the other hand, the thickness of the multilayer body side may be measured in the width directional margin portion on which the internal electrode is not present.

According to an embodiment of the present invention, the multilayer body side may mean one face of the multilayer body, on which the end of the internal electrode is not exposed.

According to an embodiment of the present invention, when the first internal electrode 121 end is exposed to the a ratio (D4/D3) of the maximum thickness D3 of the first end S1 of the multilayer body, on which the first internal electrode 121 end is exposed, to the minimum thickness D4 of the first end of the multilayer body, on which the first internal electrode 121 end is exposed, may range from 0.78 to 0.95, as shown in FIG. 3.

The maximum thickness D3 of the multilayer body end may be formed in the region on which the first electrode 121 is present, while the minimum thickness D4 of the multilayer body end may be formed in the width directional margin portions W1 and W2, on which the first internal electrode 121 is not present.

Without being particularly limited thereto, the maximum thickness D3 of the multilayer body end, on which the first electrode 121 end is exposed, may range from 200 to 300 μm.

Although not illustrated, a ratio of the minimum thickness of the second end of the multilayer body, on which the second internal electrode end is exposed, to the maximum thickness of the (multilayer body) end, on which the second internal electrode end is exposed, may range from 0.78 to 0.95.

If the ratio of D4 to D3 is less than 0.78, the width directional (W directional) end of the internal electrode is too warped, a distance between the internal electrodes adjacent up and down to each other may be reduced. Accordingly, an electric field is concentrated in the edges of the internal electrodes in the width direction, thus causing a decrease in the insulation breakdown voltage and deteriorating characteristics under high temperature and humidity conditions.

In contrast, when the ratio of D4 to D3 exceeds 0.95, the possibility of delamination and/or crack creation may be higher and characteristics under high temperature and humidity conditions may be deteriorated.

Hereinafter, a method for manufacturing a multilayer ceramic capacitor according to an embodiment of the present invention will be described in detail.

First, internal electrode patterns may be formed on a plurality of ceramic green sheets. Each of the ceramic green sheets may be fabricated using a ceramic paste which comprises a ceramic powder, an organic solvent and an organic binder.

The ceramic powder is a material having high dielectric constant and may be prepared using barium titanate ($BaTiO_3$) or strontium titanate ($SrTiO_3$) based materials, without being particularly limited thereto. Sintering the ceramic green sheet may result in a dielectric layer 111 for construction of a multilayer body.

The internal electrode pattern may be formed using the internal electrode paste containing a conductive metal. The conductive metal may include, for example, Ni, Cu, Pd or alloys thereof, without being particularly limited thereto.

A process of forming the internal electrode pattern on the ceramic green sheet is not particularly limited, however, may be formed by a printing process such as screen printing, gravure printing, etc.

The ceramic green sheets may be stacked up to form a ceramic green sheet laminate, in such a way that the internal electrode pattern, which was formed on the ceramic green sheet, is exposed on different ends from one another by a further cutting process. The ceramic green sheet laminate may be then compressed to control a ratio of thickness of the multilayer body. As described above, according to an embodiment of the present invention, the electrode withdrawal portion may be more strongly compressed than the capacity formation portion. Further, sides and lateral faces of the multilayer body may be more strongly compressed than the center of the multilayer body.

Compression described above may be conducted with a predetermined pressure. Without being particularly limited thereto, the compression may be executed by isostatic pressing. Without being particularly limited thereto, the compression may be executed under the pressure condition of 500 to 1500 $kgf/cm^2$. For the isostatic pressing, in order to execute differential compression of the capacity formation portion and the electrode withdrawal portion of the multilayer body, an additional material may be applied to each of the top and bottom surfaces of the ceramic green sheet laminate during pressing. Such additional material may include, but not being limited to, a polyethylene terephthalate (PET) film, a vinyl film, rubber, or the like.

FIG. 6 shows the internal electrode pattern formed on the ceramic green sheet, in a cut state, and may be considered to schematically illustrate a compression process described above. The additional material P may be arranged on the top and bottom surfaces of the ceramic green sheet laminate, and compressed thereto. Without being particularly limited thereto, the additional material may also be arranged on only the top or bottom portion of the ceramic green sheet, and compressed thereto.

The compression may be executed at a predetermined temperature and, preferably, at 50 to 100° C., without being particularly limited thereto.

Next, the ceramic green sheet laminate may be cut to expose the end of the internal electrode in the length direction through an end (of the ceramic green sheet laminate), thus resulting in ceramic green chips. By plasticizing and calcining each ceramic green chip, a multilayer body may be fabricated.

Such a plasticizing process may be executed for removing the binder (that is, 'debinding') and, preferably, under an atmosphere, without being particularly limited thereto.

The calcining process may be executed under a reduction atmosphere to inhibit oxidation of the internal electrode. The calcining process may also be executed at a temperature of 900 to 1300° C.

Following this, an external electrode may be provided and electrically connected to the internal electrode end exposed on the end of the multilayer body. Thereafter, a plating process using nickel, tin, etc., may be implemented on the surface of the external electrode.

Hereinafter, the present invention will be described in detail with reference to the following inventive example and comparative examples, however, the scope of the present invention is not limited to these examples.

EXAMPLE

After printing an internal electrode paste onto each of ceramic green sheets each having a thickness of 1.27 μm, 1.20 μm, 1.00 μm, 0.90 μm 0.80 μm, before calcination, 220 to 270 layers of the printed sheets were stacked to prepare a ceramic laminate. The prepared ceramic laminate was subjected to isostatic pressing at 85° C. under a pressure condition of 1000 kgf/cm$^2$. In this case, in order to reinforce the compression of an electrode withdrawal portion, an additional material such as a PET film, vinyl film or rubber was differentially applied to the top and bottom surfaces of the ceramic laminate. A multilayer body having a capacity formation portion formed therein was treated to have a greater thickness than an end of the multilayer body.

After completing the compression of the ceramic laminate, it was cut into individual chips. The cut chips were maintained at 230° C. for 60 hours under an atmosphere to implement debinding. Afterward, calcination was performed at 1200° C. under a reduction atmosphere as well as an oxygen partial pressure of $10^{-11}$ atm to $10^{-10}$ atm, which is lower than Ni/NiO equilibrium oxygen partial pressure, in order to prevent oxidation of the internal electrode. After calcination, an average thickness of the dielectric layer ranged from 0.45 to 0.70 μm while an average thickness of the internal electrode layer was 0.65 μm. The size of each calcined chip satisfied a dimension of: 0.6±0.09 mm×0.3±0.09 mm×0.3±0.09 mm (L×W×T).

Characteristics of the calcined chip were assayed and results thereof are shown in Tables 1 and 2 below.

After calcination, the thickness of one dielectric layer was determined as an average thickness of each dielectric layer arranged between the internal electrodes. With regard to the average thickness of the dielectric layer, a cross-section in the length direction of the multilayer body was first image-scanned by a scanning electron microscope (SEM) (magnified 10,000), as shown in FIG. 4. Then, from the scanned image, thicknesses of 30 positions of the dielectric layer at equal intervals in the length direction, followed by averaging the measured values. The 30 positions at equal intervals were determined in the capacity formation portion.

A rate of delamination and/or crack creation in the calcined chip was determined by cross-section checking 100 pieces of calcined chips and the determined rate of delamination and/or crack creation was expressed in percentage.

Insulation breakdown voltage ('BDV') properties were evaluated by applying DC voltage at a rate of 10V/sec. In addition, (high) temperature acceleration characteristics were assayed in NG rate according to temperature acceleration test. More particularly, after applying 9.45V DC voltage to 200 pieces of calcined chips at 135° C., the number of the calcined chips, which exhibited a decrease in insulation resistance of $10^4\Omega$ or less within 48 hours, was expressed in percentages of a total number of the chips.

Moisture resistant properties (that is, moisture resistance) were assayed in NG rates according to moisture resistance test. More particularly, after apply 6.3V DC voltage to 200 pieces of calcined chips at 40° C. and under a relative humidity of 95%, the number of the calcined chips, which exhibited a decrease in insulation resistance of $10^4\Omega$ or less within 100 hours, was expressed in percentages of a total number of the chips.

TABLE 1

|  | Thickness of dielectric layer (μm) | T1 | T2 | T2/T1 | D1 | D2 | D2/D1 | D3 | D4 | D4/D3 |
|---|---|---|---|---|---|---|---|---|---|---|
| Com. Ex. 1 | 0.70 | 275 | 267 | 0.97 | 315 | 309 | 0.98 | 309 | 299 | 0.97 |
| Com. Ex. 2 | 0.70 | 276 | 235 | 0.85 | 313 | 272 | 0.87 | 272 | 234 | 0.86 |
| Com. Ex. 3 | 0.70 | 274 | 200 | 0.73 | 316 | 237 | 0.75 | 237 | 175 | 0.74 |
| Com. Ex. 4 | 0.70 | 274 | 170 | 0.62 | 314 | 204 | 0.65 | 204 | 137 | 0.67 |
| Com. Ex. 5 | 0.65 | 276 | 270 | 0.98 | 316 | 313 | 0.99 | 313 | 310 | 0.99 |
| Com. Ex. 6 | 0.65 | 275 | 237 | 0.86 | 314 | 276 | 0.88 | 276 | 240 | 0.87 |
| Com. Ex. 7 | 0.65 | 275 | 204 | 0.74 | 315 | 239 | 0.76 | 239 | 184 | 0.77 |
| Com. Ex. 8 | 0.65 | 273 | 177 | 0.65 | 312 | 212 | 0.68 | 212 | 138 | 0.65 |

TABLE 1-continued

| | Thickness of dielectric layer (μm) | T1 | T2 | T2/T1 | D1 | D2 | D2/D1 | D3 | D4 | D4/D3 |
|---|---|---|---|---|---|---|---|---|---|---|
| Com. Ex. 9 | 0.55 | 275 | 270 | 0.98 | 315 | 312 | 0.99 | 312 | 309 | 0.99 |
| Ex. 1 | 0.55 | 276 | 262 | 0.95 | 316 | 307 | 0.97 | 307 | 291 | 0.95 |
| Ex. 2 | 0.55 | 274 | 227 | 0.83 | 313 | 269 | 0.86 | 269 | 229 | 0.85 |
| Ex. 3 | 0.55 | 276 | 204 | 0.74 | 314 | 245 | 0.78 | 245 | 196 | 0.80 |
| Ex. 4 | 0.55 | 275 | 193 | 0.70 | 315 | 236 | 0.75 | 236 | 184 | 0.78 |
| Com. Ex. 10 | 0.55 | 274 | 178 | 0.65 | 314 | 220 | 0.70 | 220 | 169 | 0.77 |
| Com. Ex. 11 | 0.55 | 277 | 161 | 0.58 | 314 | 198 | 0.63 | 198 | 138 | 0.70 |
| Com. Ex. 12 | 0.50 | 275 | 267 | 0.97 | 313 | 310 | 0.99 | 310 | 304 | 0.98 |
| Ex. 5 | 0.50 | 273 | 259 | 0.95 | 314 | 305 | 0.97 | 305 | 292 | 0.96 |
| Ex. 6 | 0.50 | 274 | 238 | 0.87 | 312 | 281 | 0.90 | 281 | 256 | 0.91 |
| Ex. 7 | 0.50 | 275 | 212 | 0.77 | 314 | 242 | 0.77 | 242 | 181 | 0.75 |
| Com. Ex. 13 | 0.50 | 276 | 188 | 0.68 | 315 | 224 | 0.71 | 224 | 161 | 0.72 |
| Com. Ex. 14 | 0.50 | 273 | 161 | 0.59 | 312 | 197 | 0.63 | 197 | 128 | 0.65 |
| Com. Ex. 15 | 0.45 | 270 | 265 | 0.98 | 310 | 307 | 0.99 | 307 | 301 | 0.98 |
| Ex. 8 | 0.45 | 272 | 253 | 0.93 | 314 | 298 | 0.95 | 298 | 277 | 0.93 |
| Ex. 9 | 0.45 | 271 | 233 | 0.86 | 313 | 275 | 0.88 | 275 | 240 | 0.87 |
| Ex. 10 | 0.45 | 270 | 197 | 0.73 | 312 | 234 | 0.75 | 234 | 171 | 0.73 |
| Com. Ex. 16 | 0.45 | 270 | 186 | 0.69 | 310 | 226 | 0.73 | 226 | 163 | 0.72 |
| Com. Ex. 17 | 0.45 | 272 | 163 | 0.60 | 311 | 202 | 0.65 | 202 | 135 | 0.67 |

TABLE 2

| | Number of lamination | Occurrence of Delam/Crack (%) | BDV (V) | NG rate in Temperature acceleration test (%) | NG rate in humidity resistance (%) |
|---|---|---|---|---|---|
| Com. Ex. 1 | 220 | 0 | 85 | 0 | 0 |
| Com. Ex. 2 | 220 | 0 | 83 | 0 | 0 |
| Com. Ex. 3 | 220 | 0 | 83 | 0 | 0 |
| Com. Ex. 4 | 220 | 0 | 85 | 0 | 0 |
| Com. Ex. 5 | 230 | 0 | 76 | 0 | 0 |
| Com. Ex. 6 | 230 | 0 | 78 | 0 | 0 |
| Com. Ex. 7 | 230 | 0 | 79 | 0 | 0 |
| Com. Ex. 8 | 230 | 0 | 77 | 0 | 0 |
| Com. Ex. 9 | 250 | 18 | 73 | 12.5 | 24.5 |
| Ex. 1 | 250 | 0 | 75 | 0 | 0 |
| Ex. 2 | 250 | 0 | 72 | 0 | 0 |
| Ex. 3 | 250 | 0 | 71 | 0 | 0 |
| Ex. 4 | 250 | 0 | 72 | 0 | 0 |
| Com. Ex. 10 | 250 | 0 | 32 | 24.5 | 10.5 |
| Com. Ex. 11 | 250 | 0 | 24 | 32.5 | 12.0 |
| Com. Ex. 12 | 260 | 20 | 68 | 10.5 | 20.5 |
| Ex. 5 | 260 | 0 | 67 | 0 | 0 |
| Ex. 6 | 260 | 0 | 68 | 0 | 0 |
| Ex. 7 | 260 | 0 | 63 | 0 | 0 |
| Com. Ex. 13 | 260 | 0 | 30 | 36.5 | 20.0 |
| Com. Ex. 14 | 260 | 0 | 25 | 32.0 | 21.5 |
| Com. Ex. 15 | 270 | 23 | 62 | 15.5 | 28.5 |
| Ex. 8 | 270 | 0 | 62 | 0 | 0 |
| Ex. 9 | 270 | 0 | 61 | 0 | 0 |
| Ex. 10 | 270 | 0 | 60 | 0 | 0 |
| Com. Ex. 16 | 270 | 0 | 27 | 42.5 | 25.5 |
| Com. Ex. 17 | 270 | 0 | 18 | 43 | 29 |

Here, T1 is a thickness of the capacity formation portion; T2 is a distance between the internal electrodes on one face of the multilayer body, on which the internal electrode ends are exposed; D1 is a thickness of the multilayer body having the capacity formation portion formed therein; D2 is a thickness of the multilayer body face, on which the internal electrode ends are exposed; D3 is the maximum thickness of the multilayer body face, on which the internal electrode ends are exposed; and D4 is the minimum thickness of the multilayer body face, on which the internal electrode ends are exposed.

T1, T2, D1 and D2 described above were measured on the cross-section in the length direction of the center of the multilayer body, on which the internal electrode ends are exposed, as shown in FIG. 4. On the other hand, D3 and D4 were measured on the multilayer body face, on which the internal electrode ends are exposed.

Referring to Tables 1 and 2 described above, Comparative Examples 1 to 8 wherein a thickness of the dielectric layer after calcining is 0.65 μM or more, exhibited no demonstrate delamination and crack creation, regardless of the ratio of T1 and T2 an showed high BDV, however, did not demonstrate high load nor humidity resistance NG rates.

On the contrary, Comparative Examples 9, 12 and 15 wherein a thickness of the dielectric layer after calcining is 0.65 μm or less, had relatively low compression rate of the electrode withdrawal portion, and showed high delamination and crack creation, however, decreased temperature acceleration characteristics and low humidity resistance. Further, Comparative Examples 10, 11, 13, 14, 16 and 17 with relatively high compression rate of the electrode withdrawal portion, exhibited a decrease in BDV characteristics due to excessive compression, although delamination and/or crack creation did not occur. As a result, it was confirmed that NG rates in both the high temperature acceleration test and the humidity resistance test are high. From this result, it may be presumed that an electric field was concentrated, since the internal electrode end in the length direction was warped and a thickness of the dielectric layer was decreased.

On the other hand, it can be seen from Examples 1 to 10, that the compression rate of each of the capacity formation portion and the electrode withdrawal portion was controlled, thus preventing delamination and/or crack creation. In addition, it may be considered that, since warping of the internal electrode end does not occur (or is decreased) as it is closer to the width directional or length directional margin portion, a thickness of the dielectric layer is not reduced. Consequently, BDV characteristics were not degraded, high temperature acceleration characteristics and humidity resistance were excellent, and deterioration in reliability caused by penetration of a plating solution was not observed.

As set forth above, according to an embodiment of the present invention, although a thickness of the dielectric layer and the internal electrode layer is decreased, concentration of an electric field to a local region may be prevented by controlling a compression ratio of the capacity formation portion and the electrode withdrawal portion, in addition, the possibility of delamination and/or crack creation may be reduced.

According to an embodiment of the present invention, controlling a thickness ratio between the capacity formation portion and the internal electrodes withdrawing toward the multilayer body face may prevent concentration of an electric field to a local region and, in addition, reduce the possibility of delamination and/or crack creation.

According to an embodiment of the present invention, controlling a thickness ratio between the multilayer body and the multilayer body face may prevent concentration of an electric field to a local region and, in addition, reduce the possibility of delamination and/or crack creation.

According to an embodiment of the present invention, controlling a thickness ratio between the center and the lateral face of the multilayer body in a width direction of the multilayer body may prevent concentration of an electric field to a local region and, in addition, reduce the possibility of delamination and/or crack creation.

According to an embodiment of the present invention, the possibility of insulation breakdown is reduced, which in turn, leads to superior insulation breakdown voltage properties and excellent characteristics under high temperature and humidity conditions.

While the present invention has been shown and described in connection with the foregoing embodiments and the accompanying drawings, it will be apparent to those skilled in the art that modifications and variations can be made without departing from the spirit and scope of the invention as defined by the appended claims.

What is claimed is:

1. A multilayer ceramic electronic component, comprising:
a lamination main body including a plurality of inner electrodes, wherein:
a thickness of the lamination main body, in which the capacity formation part is formed, is greater than a thickness of a face of the lamination main body to which the ends of the internal electrodes are exposed,
a ratio of a minimum thickness of a face of the lamination main body to a maximum thickness of the face of the lamination main body, to which the ends of the internal electrodes are exposed, ranges from 0.78 to 0.95, and
the thickness of the lamination main body having the capacity formation part formed therein ranges from 310 to 320 µm.

2. The multilayer ceramic electronic component of claim 1, wherein:
when T1 represents a thickness of a capacity formation part formed by overlapping the plurality of internal electrode layers, and T2 represents a distance between ends of outermost internal electrodes arranged on the face of the lamination main body to which the ends of the internal electrodes are exposed, wherein a ratio of T2 to T1 (T2/T1) ranges from 0.70 to 0.95, and
the thickness of the lamination main body having the capacity formation part formed therein is a maximum thickness of the lamination main body.

3. The multilayer ceramic electronic component of claim 2, wherein the thickness T1 of the capacity formation part is a distance between the outermost internal electrodes arranged in a center of the lamination main body.

4. The multilayer ceramic electronic component of claim 2, wherein the thickness T1 of the capacity formation part and the distance T2 between the ends of outermost internal electrodes arranged on a face of the lamination main body to which the ends of the internal electrodes are exposed, are formed in the same cross-section of the lamination main body.

5. The multilayer ceramic electronic component of claim 2, wherein the distance T2 between the ends of outermost internal electrodes arranged on a face of the lamination main body to which the ends of the internal electrodes are exposed, is formed in a center of a face of the lamination main body.

6. The multilayer ceramic electronic component of claim 2, wherein a ratio of a thickness of a face of the lamination main body to which the ends of the internal electrodes are exposed, to a thickness of the lamination main body having the capacity formation part formed therein, ranges from 0.75 to 0.97.

7. The multilayer ceramic electronic component of claim 2, wherein the thickness of the lamination main body having the capacity formation part formed therein is greater than a thickness of a face of the lamination main body, to which the ends of the internal electrodes are not exposed.

8. The multilayer ceramic electronic component of claim 2, wherein the thickness T1 of the capacity formation part ranges from 270 to 280 µm.

9. The multilayer ceramic electronic component of claim 1, wherein the thickness T1 of the capacity formation part is measured as a distance between an internal electrode arranged on an uppermost layer and another internal electrode arranged on a lowermost layer, on an intersecting line of two cross-sections perpendicular to each other at a center of the lamination main body.

10. The multilayer ceramic electronic component of claim 1, wherein the minimum thickness of a face of the lamination main body is formed on a margin part, on which internal electrodes are not present.

11. The multilayer ceramic electronic component of claim 1, wherein a thickness of the dielectric layer arranged between the internal electrode layers is less than 0.65 µm.

12. The multilayer ceramic electronic component of claim 1, wherein a thickness of each of the internal electrode layers is 0.7 µm or less.

13. A multilayer ceramic electronic component, comprising:
a multilayer body having a dielectric layer; and
a plurality of internal electrode layers provided in the multilayer body, and having ends exposed to at least one face of the multilayer body, wherein:
a thickness of the multilayer body, in which the capacity formation part is formed, is greater than a thickness of one face of the multilayer body to which the ends of the internal electrodes are exposed,
a ratio of the thickness of one face of the multilayer body to which the ends of the internal electrodes are exposed, to the thickness of the multilayer body having the capacity formation part formed therein, ranges from 0.75 to 0.97, and the thickness of the multilayer body having the capacity formation part formed therein ranges from 310 to 320 μm.

14. The multilayer ceramic electronic component of claim 13, wherein a thickness of the capacity formation part ranges from 270 to 280 μm.

15. The multilayer ceramic electronic component of claim 13, wherein a minimum thickness of a face of the multilayer body is formed on a margin part, on which internal electrodes are not present.

16. The multilayer ceramic electronic component of claim 13, wherein a thickness of the dielectric layer arranged between the internal electrode layers is less than 0.65 μm.

17. The multilayer ceramic electronic component of claim 13, wherein a thickness of each of the internal electrode layers is 0.7 μm or less.

* * * * *